United States Patent
Zhang et al.

(10) Patent No.: US 11,892,581 B2
(45) Date of Patent: Feb. 6, 2024

(54) METHODS AND SYSTEMS FOR CHARACTERIZING CLAY CONTENT OF A GEOLOGICAL FORMATION

(71) Applicants: Schlumberger Technology Corporation, Sugar Land, TX (US); SAUDI ARABIAN OIL COMPANY, Dhahran (SA)

(72) Inventors: Ping Zhang, Albany, CA (US); Wael Abdallah, Al-Khobar (SA); Shouxiang Ma, Dhahran (SA); Chengbing Liu, Dhahran (SA)

(73) Assignees: SCHLUMBERGER TECHNOLOGY CORPORATION, Sugar Land, TX (US); SAUDI ARABIAN OIL COMPANY, Dhahran (SA)

( * ) Notice: Subject to any disclaimer, the term of this patent is extended or adjusted under 35 U.S.C. 154(b) by 146 days.

(21) Appl. No.: 16/984,210

(22) Filed: Aug. 4, 2020

(65) Prior Publication Data
US 2021/0124071 A1 Apr. 29, 2021

Related U.S. Application Data

(60) Provisional application No. 62/925,839, filed on Oct. 25, 2019.

(51) Int. Cl.
G01V 1/30 (2006.01)
G06N 20/00 (2019.01)
E21B 49/08 (2006.01)
E21B 49/00 (2006.01)

(52) U.S. Cl.
CPC ............ *G01V 1/306* (2013.01); *E21B 49/005* (2013.01); *E21B 49/0875* (2020.05); *G06N 20/00* (2019.01)

(58) Field of Classification Search
CPC .... G01V 1/306; G06N 20/00; E21B 49/0875; E21B 49/005
See application file for complete search history.

(56) References Cited

U.S. PATENT DOCUMENTS

| 4,584,874 A | 4/1986 | Ruhovets |
| 4,594,887 A * | 6/1986 | Fertl ..................... G01V 11/00 73/152.14 |

(Continued)

FOREIGN PATENT DOCUMENTS

WO 2018067757 A1 4/2018

OTHER PUBLICATIONS

Ramirez, Thaimar R., et al. "Comparative study of formation evaluation methods for unconventional shale-gas reservoirs: application to the Haynesville shale (Texas)." North American Unconventional Gas Conference and Exhibition. OnePetro, 2011. (Year: 2011).*

(Continued)

*Primary Examiner* — Raymond L Nimox
(74) *Attorney, Agent, or Firm* — Jeffrey D. Frantz

(57) ABSTRACT

Methods and systems are provided that determine or estimate total clay volume fraction in a formation for well log data of the formation using machine learning are described. Methods and systems are also provided that employ computation models to determine amounts or concentrations of at least one clay mineral in the formation from total clay volume fraction of the formation.

19 Claims, 3 Drawing Sheets

(56) References Cited

U.S. PATENT DOCUMENTS

| | | | | |
|---|---|---|---|---|
| 4,622,849 | A * | 11/1986 | Fertl | G01V 11/00 73/152.02 |
| 4,712,424 | A * | 12/1987 | Herron | G01V 11/00 250/269.1 |
| 4,722,220 | A * | 2/1988 | Herron | G01V 11/00 73/152.14 |
| 4,756,189 | A * | 7/1988 | Fertl | G01V 11/00 73/152.05 |
| 4,769,606 | A * | 9/1988 | Vinegar | G01V 3/24 324/362 |
| 4,903,527 | A * | 2/1990 | Herron | G01V 11/00 73/152.05 |
| 4,953,399 | A * | 9/1990 | Fertl | G01V 11/00 73/152.02 |
| 6,646,437 | B1 | 11/2003 | Chitale et al. | |
| 7,501,829 | B2 | 3/2009 | Davydychev et al. | |
| 8,274,399 | B2 * | 9/2012 | Strachan | G05B 13/048 340/870.02 |
| 10,215,876 | B2 | 2/2019 | Zhang et al. | |
| 11,237,292 | B2 | 2/2022 | Ma et al. | |
| 2014/0107928 | A1 | 4/2014 | Roy et al. | |
| 2014/0214324 | A1 | 7/2014 | Freedman et al. | |
| 2015/0241591 | A1 * | 8/2015 | Burmester | G01V 11/00 702/7 |
| 2016/0097876 | A1 * | 4/2016 | Freed | G01V 3/30 703/2 |
| 2016/0169854 | A1 * | 6/2016 | Greathouse | G01N 27/041 702/27 |
| 2016/0186556 | A1 * | 6/2016 | Rasmus | G06F 17/11 703/2 |
| 2016/0187521 | A1 | 6/2016 | Homan et al. | |
| 2017/0053046 | A1 | 2/2017 | Forsyth et al. | |
| 2017/0315259 | A1 | 11/2017 | Quirein et al. | |
| 2018/0100942 | A1 * | 4/2018 | Zhang | G01V 3/10 |
| 2018/0120468 | A1 * | 5/2018 | Seleznev | G01V 3/20 |
| 2018/0164466 | A1 * | 6/2018 | Zhang | G01V 3/38 |
| 2019/0086350 | A1 | 3/2019 | Cerepi et al. | |
| 2019/0129056 | A1 | 5/2019 | Rasmus et al. | |
| 2020/0025967 | A1 | 1/2020 | Zhang et al. | |
| 2021/0123877 | A1 | 4/2021 | Abdallah et al. | |

OTHER PUBLICATIONS

Heidari, Zoya, Carlos Torres-Verdin, and William E. Preeg. "Improved estimation of mineral and fluid volumetric concentrations from well logs in thinly bedded and invaded formations." Geophysics 77.3 (2012): WA79-WA98. (Year: 2012).*

Mollajan, Amir, et al. "A Bayesian approach to identify clay minerals from petrophysical logs in Gonbadly Gas field, northeastern Iran." ARMA US Rock Mechanics/Geomechanics Symposium. ARMA, 2013. (Year: 2013).*

Ruhovets, N., and Walter H. Fertl. "Volumes, Types, and Distribution of Clay Minerals in Reservoir Rocks Based on Well Logs." Paper presented at the SPE Unconventional Gas Recovery Symposium, Pittsburgh, Pennsylvania, May 1982. doi: https://doi.org/10.2118/10796-MS (Year: 1982).*

Fertl, Walter H. "Clay Typing Based On Well Logs." Paper presented at the Annual Technical Meeting, Calgary, Alberta, Jun. 1986. doi: https://doi.org/10.2118/86-37-18 (Year: 1986).*

Ruhovets, N., and Walter H. Fertl. "Digital Shaly Sand Analysis Based On Waxman-Smits Model And Log-Derived Clay Typing." The Log Analyst 23 (1982): No Pagination Specified. (Year: 1982).*

Notice of Allowance issued in U.S. Appl. No. 16/663,673 dated Jan. 12, 2022, 17 pages.

Office Action issued in U.S. Appl. No. 16/663,673 dated Jun. 11, 2021, 22 pages.

Dargahi, et al., 2013, Clay Mineralogy of Shale Gas Reservoirs through Integrating Infrared Spectroscopy and X-Ray Diffraction, SPE 168908, Unconventional Resources Technology Conference held in Denver, Colorado, USA, Aug. 12-14, 2013 (10 pages).

Beckhoff, B. et al., (Eds.), 2007. Handbook of practical X-ray fluorescence analysis, Chapter 5 Quantitative Analysis, pp. 309-410.

Dudoignon and Pantet, 1998, Measurement and cartography of clay matrix orientations by image analysis and grey-level diagram decomposition, Clay Minerals (1998), 33, 629-642.

Berligen, B. A. et al., "Estimation of Productivity of Lobo 6 Sand (Lower Wilcox, TX) by Identifying Diagenetic Clays Using Well Log Data," SPE 14278, 1985, SPE of AIME 60th annual Technical conference, Las Vegas, Nevada, U. S. A., 15 pages.

Charsky, A. et al., "Quantitative analysis of kerogen content and mineralogy in shale cuttings by Diffuse Reflectance Infrared Fourier Transform Spectroscopy", Paper SCA2012-27, Proceedings of the Society of Core Analysts 2012 International Symposium, Aberdeen, Scotland, 2012, 12 pages.

Fertl, W. H., "Gamma Ray Spectral Data Assists in Complex Formation Evaluation," transactions, 6th European SPWLA formation evaluation symposium, The Log Analyst, 1979, 20(5), pp. 3-37.

Freedman, R. et al., "New Method for Determining Mineralogy and Matrix Properties from Elemental Chemistry Measured by Gamma Ray Spectroscopy Logging Tools", SPE 170722, presented at the SPE Annual Technical Conference and Exhibition, Amsterdam, The Netherlands, 2014, 16 pages.

Hassan, M. et al., "Fundamentals of Differential Gamma Ray Log-Interpretation Techniques," Paper H, Transactions SPWLA, 1976, 18 pages.

Herron, S. et al., "Application and Quality Control of Core Data for the Development and Validation of Elemental Spectroscopy Log Interpretation" SPWLA-2014-LLL presented at the SPWLA 55th Annual Logging Symposium held in Abu Dhabi, UAE, 2014, pp. 1-23.

Johansen, J. B. et al., "Downhole neutron-induced spectroscopy element and mineral estimates compared to a ring-tested core reference," SWPAL-2019-0000 presented at the SPWLA 60th Annual Logging Symposium held in The Woodlands, Texas, U.S.A., 2019, 12 pages.

Kale, S. et al., "Rock Typing in Gas Shales," SPE 134539, presented at the SPE Annual Technical Conference and Exhibition held in Florence, Italy, 2010, 20 pages.

Kaufhold, S. et al, "Quantification of the mineralogical composition of clays using FTIR spectroscopy", Journal of Vibrational Spectroscopy, 2012, 59, p. 29-39.

Leroy, P. et al., "A triple-layer model of the surface electrochemical properties of clay minerals", Journal of Colloid and Interface Science, 2004, 270, pp. 371-380.

MacDonald, R. M. et al., "Comparison of Elemental and Mineral Abundances from Core and Three Modern Neutron Induced Elemental Spectroscopy Tools", SPWLA-2011-BBB, presented at the SPWLA 52nd Annual Logging Symposium, Colorado Springs, Colorado, U. S. A., 2011, 17 pages.

MacDonald, R. M. et al., "Comparison of Elemental and Mineral Abundances from Core and Three Modern Neutron Induced Elemental Spectroscopy Tools" Petrophysics, 2012, 53(4), pp. 272-284.

Matteson, A. et al., "Quantitative mineral analysis by fourier transform infrared spectroscopy", 1993 SCA Conference Paper No. 9308, 16 pages.

Revil, A., "Spectral induced polarization of shaly sands: Influence of the electrical double layer", Water Resources Research, 2012, 48, W02517, 23 pages.

Sondergeld, C. H. et al., "Petrophysical Considerations in Evaluating and Producing Shale Gas Resources", SPE 131768, presented at the 2010 SPE Unconventional Gas Conference, Pittsburgh, Pennsylvania, U. S. A., 34 pages.

Hou, C.-Y. et al., "Low frequency complex dielectric (conductivity) response of dilute clay suspensions: Modeling and experiments", Journal of Colloid and Interface Science, 2018, 525, pp. 62-75.

International Search Report and Written Opinion of International Patent Application No. PCT/US2020/057106 dated Feb. 3, 2021, 11 pages.

Notice of Allowance issued in U.S. Appl. No. 16/663,673 dated Apr. 28, 2022, 13 pages.

International Preliminary Report on Patentability issued in PCT Application No. PCT/US2020/057106 dated May 5, 2022, 7 pages.

(56) References Cited

OTHER PUBLICATIONS

Notice of Allowance issued in U.S. Appl. No. 16/663,636 dated Sep. 29, 2021, 14 pages.
Office Action issued in U.S. Appl. No. 17/588,897 dated Jan. 19, 2023, 32 pages.
Williams, D.E., "Slant Well Intake Systems: Design and Construction", Chapter 13 In: Intakes and Outfalls for Seawater Reverse-Osmosis Desalination Facilities. Environmental Science and Engineering, Missimer, T., Jones, B., Maliva, R. (eds), 2015, 61 pages.
Hou, et al., Low Frequency Complex Dielectric (conductivity) response of dilute clay suspensions: Modeling and experiments, Journal of Colloid and Interface Science, 2018, pp. 62-75.
Notice of Allowance issued in U.S. Appl. No. 16/663,673 dated Jul. 15, 2022, 13 pages.
Substantive Exam issued in Saudi Arabia Patent Application No. 522432356 dated Jul. 26, 2023, 23 pages with English translation.
Sill, W. R. et al., "The Electrical Properties of Clay", Open-File Report, 1981, retrieved from the Internet: URL: https://pubs.usgs.gov/of/1981/0989/report.pdf, 75 pages.
Al-Mjeni, Rifaat et al., The Influence of Clay Fractions on the Complex Impedance of Shaly Sands, retrieved from the internet: URL: https://jgmaas.com/SCA/2002/SCA2002-29.pdf, 12 pages.
Garrouch, Ali A. et al., "The influence of clay content, salinity, stress, and wettability on the dielectric properties of brine-saturated rocks: 10 Hz to 10 MHz", Geophysics, 1994, 59(6), pp. 907-917.
Cosenza, P. et al., "A physical model of the low-frequency electrical polarization of clay rocks", Journal of Geophysical Research, 2008, 113, 9 pages.
Revil, A., "Low-frequency complex conductivity of sandy and clayey materials", Journal of Colloid and Interface Science, 2013, 298, pp. 193-209.
Extended Search Report issued in European Patent Application No. 20879809.0 dated Oct. 26, 2023, 7 pages.

\* cited by examiner

METHODS AND SYSTEMS FOR CHARACTERIZING CLAY CONTENT OF A GEOLOGICAL FORMATION

CROSS-REFERENCE TO RELATED APPLICATION(S)

The present disclosure claims priority from U.S. Provisional Appl. No. 62/925,839, filed on Oct. 25, 2019, entitled "FORMATION CLAY TYPING USING MACHINE LEARNING," herein incorporated by reference in its entirety.

FIELD

The present disclosure relates to methods and systems that characterize properties of clay contained in a geological formation.

BACKGROUND

The type and amount (e.g. concentration) of clay minerals in hydrocarbon bearing geological formations can have a significant impact on formation evaluation and reservoir performance studies. Tremendous efforts have been applied to identify the type and amount of clay minerals in such geological formations using well logs. Different well logs have different sensitivity to the clay minerals and some techniques are found useful for clay typing. The density-neutron log cross-plot technique has long been used as a method for qualitative analysis of clay minerals in oil and water saturated shaly sands. Modern technologies of element analysis obtained through tools such as LITHOSCAN-NER™ of Schlumberger can be used for quantitative analysis of a type and amount (e.g., concentration) of clays minerals in a geological formation, but they are not commonly acquired in routine operations due to operational and economic considerations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In embodiments, methods and systems are provided for characterizing an amount or concentration (such as volume fraction) of various clay minerals in a geological formation (i.e., subsurface rock) using well log data that is commonly acquired in routine operations for evaluating the geological formation. Such well log data can be measured at various depths in a well that traverses the geological formation and thus is measured at different locations or depths in the geological formation corresponding to such well depths. In embodiments, such well log data can include formation induction resistivity (RT) log data, formation total porosity (PHIT) log data, and gamma ray (GR) log data.

In embodiments, methods and systems are provided that employ a machine learning system that is configured to correlate well log data from the commonly-acquired well logging operations at a given well depth (such as formation resistivity (RT) log data, formation total porosity (PHIT) log data, and gamma ray (GR) log data for the given well depth) to total clay volume fraction at the given well depth. In embodiments, the machine learning system can be an artificial neural network (ANN), neural network (NN), system of ANNs or NNs or other suitable machine learning systems.

In embodiments, methods and systems are provided that employ a first computational model that relates total clay volume fraction at a given well depth and amounts or concentrations of a set of clay minerals at the given well depth (which make up the total clay volume fraction) to an apparent or estimated cation exchange capacity (CEC) value for the given well depth. In embodiments, the set of clay minerals can include kaolinite, chlorite, illite and smectite, which are the clay minerals most commonly encountered in subsurface reservoir rocks.

In embodiments, methods and systems are provided that employ a second computational model that relates induction log data at a given well depth to a calculated CEC value. For example, the second computational model can be based on the model and workflow described in U.S. Pat. No. 10,215,876 to Zhang et al., herein incorporated by reference in its entirety. This model uses induction log data at a given well depth along with core sample analysis and formation temperature log data as inputs to determine a calculated CEC value.

In embodiments, methods and systems are provided that use the first computational model to determine multiple apparent CEC profiles for an interval of the well. Each apparent CEC profile includes apparent CEC values for a number of well depths (or well locations) within the interval of the well. Because the amounts or concentrations of the set of clay minerals are unknown in the analysis, the multiple apparent CEC profiles are based on different solutions to the first computational model that assume varying amounts or concentrations of the set of clay minerals. Specifically, each apparent CEC profile can be based on a solution to the first computational model that assumes particular amounts or concentrations of the set of clay minerals that is shared over the interval of the well. The particular amounts or concentrations of the set of clay minerals can be varied over the multiple apparent CEC profiles to account for the unknown amounts or concentrations of the set of clay minerals. Induction log data (and possibly other measurements and log data) for the interval of the well can be used as inputs to the second computational model to determine a calculated CEC profile for the interval of the well. The calculated CEC profile includes calculated CEC values for the number of well depths (or well locations) within the interval of the well. The calculated CEC profile can be used as a ground truth, and each one of the multiple apparent CEC profiles can be compared, for example, by pattern recognition, to the calculated CEC profile (ground truth) to identify the particular "matching" apparent CEC profile that belongs to the multiple apparent CEC profiles and most-closely matches or corresponds to the calculated CEC profile. The particular "matching" apparent CEC profile as identified by the matching analysis can be used to determine amounts or concentrations (preferably as volume fractions) for the set of clay minerals. These determined amounts or concentrations for the set of clay minerals can be assigned to (or otherwise associated with) one or more wells depths (or well locations) with the interval of the well or the interval itself. Specifically, the particular amounts or concentrations of the set of clay minerals that is assumed for the identified "matching" apparent CEC profile can be used to determine the amounts or concentrations (preferably as volume fractions) of the set of clay types for one or more wells depths (or well locations) with the well interval or for the interval itself.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
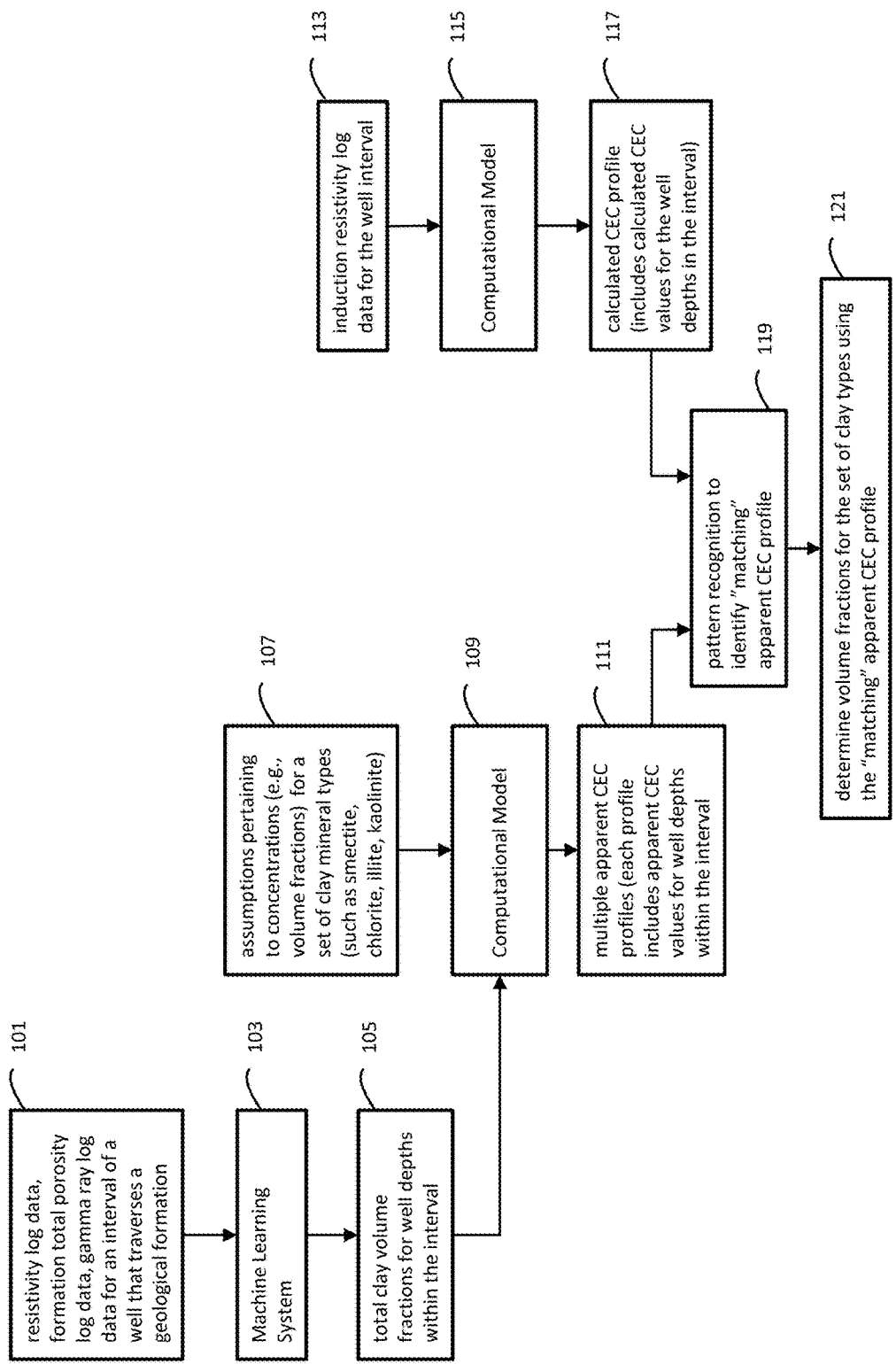
FIG. 1 is a schematic diagram illustrating a methodology for determining amount or concentrations (such as volume fractions) of different clay minerals in a geological formation.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

The present disclosure provides a workflow for characterizing amount or concentration (such as volume fraction) of various clay minerals in a geological formation (i.e., subsurface rock) using well log data that is commonly acquired in routine operations for evaluating the geological formation and thus are acquired for almost every geological formation and well drilled. Such log data can be measured at varied depths in a well that traverses the geological formation and thus is measured at different locations or depths in the geological formation corresponding to such well depths. In embodiments, such well log data can include formation induction resistivity (RT) log data, formation total porosity (PHIT) log data, and gamma ray (GR) log data.

The amount or concentration of clay minerals in a geological formation can affect different log readings. For example, the presence of hydrogen associated with clay minerals can greatly increase the apparent neutron log porosity and formation total porosity (PHIT) log data determined therefrom, for example, by a density-neutron cross plot. In another example, clay minerals can alter formation resistivity (RT) log data measured by a resistivity tool so that a direct application of the Archie model in a shaly sand formation yields water saturations which are too high. In addition, gamma ray (GR) log data can also depend on the type and concentration of clay minerals. Thus, the existence of clay minerals can affect all the above log readings and there is no established quantitative relationship that connects or correlates these log readings to the amount or concentration of different clay minerals in the geological formation.

As part of the workflow, a machine learning system can be configured to correlate certain log data from commonly-acquired well logging operations at a given well depth (such as formation resistivity (RT) log data, formation total porosity (PHIT) log data, and gamma ray (GR) log data for the given well depth) to total clay volume fraction at the given well depth. In embodiments, the machine learning system can be an artificial neural network (ANN), neural network (NN), system of ANNs or NNs or other suitable machine learning systems.

In embodiments, the workflow can also employ a first computational model that relates total clay volume fraction at a given well depth and amounts or concentrations of a set of clay minerals at the given well depth (which make up the total clay volume fraction) to an apparent or estimated cation exchange capacity (CEC) value for the given well depth. In embodiments, the set of clay minerals can include kaolinite, chlorite, illite and smectite, which are the clay minerals most commonly encountered in subsurface reservoir rocks. A geological formation rarely contains only one kind of clay mineral but instead normally has mixtures of different clay minerals. In this case, the first computational model can relate total clay volume fraction at a given well depth and amounts or concentrations of the clay minerals of the mixture at the given well depth to an apparent CEC value for the given well depth.

In embodiments, the workflow can also employ a second computational model that relates induction log data at a given well depth to a calculated CEC value. For example, the second computational model can be based on the model and workflow described in U.S. Pat. No. 10,215,876 to Zhang et al., herein incorporated by reference in its entirety. This model uses induction log data at a given well depth along with core sample analysis and formation temperature log data as inputs to determine a calculated CEC value.

In embodiments, the workflow can use the first computational model to determine multiple apparent CEC profiles for an interval of the well. Each apparent CEC profile includes apparent CEC values for a number of well depths (or well locations) within the interval of the well. Because the amounts or concentrations of the set of clay minerals are unknown in the analysis, the multiple apparent CEC profiles are based on different solutions to the first computational model that assume varying amounts or concentrations of the set of clay minerals. Specifically, each apparent CEC profile can be based on a solution to the first computational model that assumes particular amounts or concentrations of the set of clay minerals that is shared over the interval of the well. The particular amounts or concentrations of the set of clay minerals can be varied over the multiple apparent CEC profiles to account for the unknown amounts or concentrations of the set of clay minerals. Induction log data (and possibly other measurements and log data) for the interval of the well can be used as inputs to the second computational model to determine a calculated CEC profile for the interval of the well. The calculated CEC profile includes calculated CEC values for the number of well depths (or well locations) within the interval of the well. The calculated CEC profile can be used as a ground truth, and each one of the multiple apparent CEC profiles can be compared, for example, by pattern recognition to the calculated CEC profile (ground truth) to identify the "matching" apparent CEC profile that belongs to the multiple apparent CEC profiles and most-closely matches or corresponds to the calculated CEC profile. For cases where there is mismatch between the well depths (or well locations) of the multiple apparent CEC profiles and the well depths (or well locations) of the calculated CEC profile, interpolation or approximation methods can be used to determine the multiple apparent CEC profiles and/or the calculated CEC profiles at matching well depths (or matching well locations) suitable for the matching analysis. The "matching" apparent CEC profile as identified by the matching analysis is used to determine amounts or concentrations (preferably as volume fractions) for the set of clay minerals. These determined amounts or concentrations for the set of clay minerals can be assigned to (or otherwise associated with) one or more wells depths (or well locations) with the interval of the well or the interval itself. Specifically, the particular amounts or concentrations of the set of clay minerals that is assumed for the identified "matching" apparent CEC profile can be used to determine the amounts or concentrations (preferably as volume fractions) of the set of clay types for one or more well depths (or well locations) with the well interval or for the interval itself.

FIG. 1 shows a methodology or framework for determining amounts or concentrations (such as volume fractions) of different clay minerals in a geological formation according to an embodiment of the present disclosure. The methodology begins in block 101 where formation resistivity log data, formation total porosity log data, and gamma ray log data are obtained for an interval of a well that traverses the geological formation. The formation resistivity (RT) log data can be obtained from downhole logging measurements carried out by a resistivity tool that is positioned at one or more well locations (or measurement stations) with the interval of the well. The formation total porosity (PHIT) log data can be obtained from downhole logging measurements carried out by a density, neutron porosity or nuclear magnetic resonance logging tool that is positioned at one or more well locations (or measurement stations) with the interval of the well. The gamma ray (GR) log data can be obtained from downhole logging measurements carried out by a gamma ray logging tool that is positioned at one or more well locations (or measurement stations) with the interval of the well. In other embodiments, other commonly acquired well log data for the well interval can be obtained in block 101.

In block 103, a machine learning system is configured to determine a total clay volume fraction ($V_T$) for a well depth within the well interval from the well log data obtained in block 101 that corresponds to that well depth. This operation can be performed separately for a number of well depths in the interval such that the machine learning system is used to determine total clay volume fractions (block 105) for the number of well depths within the well interval from the log data obtained in block 101. In embodiments, the machine learning system of block 103 can be an artificial neural network (ANN), system of ANNs, or other suitable machine learning systems.

In block 107, the operations define assumptions that pertain to amounts or concentrations (e.g., volume fractions) of a predefined set of clay mineral types for a given well depth. In embodiments, the predefined set of clay mineral types can include kaolinite, chlorite, illite and smectite. Other suitable clay mineral types can also be used. For example, the assumptions can provide constraints that the volume fraction of kaolinite ($V_K$) at a given well depth is between zero and the total clay volume fraction ($V_T$) at the given well depth, the volume fraction of chlorite ($V_C$) at a given well depth is between zero and the total clay volume fraction ($V_T$) at the given well depth, the volume fraction of illite ($V_I$) at a given well depth is between zero and the total clay volume fraction ($V_T$) at the given well depth, and the volume fraction of smectite ($V_S$) at a given well depth is between zero and the total clay volume fraction ($V_T$) at the given well depth. These constraints can be defined separately for the number of well depths within the well interval. The total clay volume fraction ($V_T$) at the given well depth can be provided by the machine learning system as part of block 105.

In block 109, a first computational model is provided that relates total clay volume fraction ($V_T$) at a given well depth and amount or concentrations of the predefined set of clay mineral types at the given well depth together with the related assumptions of block 107 to an apparent CEC value for the given well depth. In embodiments, the amounts or concentrations of the predefined set of clay mineral types can be defined by weight (mass) percentages, weight (mass) fractions, volume percentages, or volume fractions of the predefined set of clay mineral types in the reservoir rock for the given well depth. In embodiments, the first computational model can be based on aggregation of the predefined set of clay mineral types, which have different molecular structures and compositions. Each clay mineral type has different characteristics, which is translated to what is called cation exchange capacity (CEC).

In embodiments, the first computational model of block 109 can be configured to model the formation rock as containing a mixture of the clay mineral types that include kaolinite, chlorite, illite and smectite. In this model, an apparent CEC value ($CEC_T$) for a given well depth can be calculated based on the following mixing law:

$$W_T \times CEC_T = W_C \times CEC_C + W_I \times CEC_I + W_K \times CEC_K + W_S \times CEC_S \quad \text{Eqn. (1)}$$

where $W_C$, $W_I$, $W_K$, $W_S$ are weight percentages (% wt) for chlorite (C), illite (I), kaolinite (K) and smectite (S), respectively, in the reservoir rock of a given well depth; $W_C$, $W_I$, $W_K$, $W_S$ are unknown;

$CEC_C$, $CEC_I$, $CEC_K$, $CEC_S$ are CEC values for chlorite (C), illite (I), kaolinite (K) and smectite (S), respectively; $CEC_C$, $CEC_I$, $CEC_K$, $CEC_S$ are known from literature and constant for all well depths in the reservoir rock;

$CEC_T$ is the apparent CEC value for the mixture of the clay mineral types (total clay) in the reservoir rock of the given well depth; $CEC_T$ is an unknown; and $W_T$ is the weight percentage (% wt) of the mixture of the clay mineral types (total clay) in the reservoir rock of the given well depth.

The weight percentage $W_T$ can be related to the weight percentages $W_C$, $W_I$, $W_K$, $W_S$ by:

$$W_T = W_C + W_I + W_K + W_S. \quad \text{Eqn. (2)}$$

The mixing law of eqns. (1) and (2) can also be rewritten using weight fractions as follows:

$$CEC_T = w_C \times CEC_C + w_I \times CEC_I + w_K \times CEC_K + w_S \times CEC_S \quad \text{Eqn. (3)}$$

where $w_C$, $w_I$, $w_K$, $w_S$ are weight fractions for chlorite (C), illite (I), kaolinite (K) and smectite (S), respectively, in the reservoir rock of a given well depth; $w_C$, $W_I$, $w_K$, $w_S$ are unknown;

$CEC_C$, $CEC_I$, $CEC_K$, $CEC_S$ are CEC values for chlorite (C), illite (I), kaolinite (K) and smectite (S), respectively; $CEC_C$, $CEC_I$, $CEC_K$, $CEC_S$ are known from literature and constant for all well depths in the reservoir rock;

$CEC_T$ is the apparent CEC value for the mixture of the clay mineral types (total clay) in the reservoir rock of the given well depth; $CEC_T$ is an unknown; and $w_T$ is the weight fraction of the mixture of the clay mineral types (total clay) in the reservoir rock of the given well depth.

The weight fraction $W_T$ can be related to the weight fractions $w_C$, $w_I$, $w_K$, $w_S$ by:

$$1 = w_C + w_I + w_K + w_S. \qquad \text{Eqn. (4)}$$

Furthermore, the weight fractions $w_C$, $w_I$, $w_K$, $w_S$ can be related to the weight percentages $W_C$, $W_I$, $W_K$, $W_S$ by:

$$w_C = W_C / W_T \qquad \text{Eqn. (5a)}$$

$$w_I = W_I / W_T \qquad \text{Eqn. (5b)}$$

$$w_K = W_K / W_T \qquad \text{Eqn. (5c)}$$

$$w_S = W_S / W_T \qquad \text{Eqn. (5d)}$$

Furthermore, the total clay weight fraction $W_T$ of the reservoir rock for a given well depth can be related to formation total porosity ($\phi_{total}$) for the given well depth, the density ($\rho_{clay}$) of the mixture of the clay mineral types (total clay) for the given well depth, the density of rock matrix ($\rho_{matrix}$) and the total clay volume fraction ($V_T$) of the mixture of the clay mineral types for the given well depth as follows:

$$V_T = \frac{\rho_{matrix} \times (1 - \phi_{total}) \times w_T}{\rho_{clay}} \qquad \text{Eqn. (6)}$$

The mixing law of eqns. (1) and (2) can also be rewritten using volume fractions as follows:

$$V_T \times CEC_T = V_C \times CEC_C + V_I \times CEC_I + V_K \times CEC_K + V_S \times CEC_S \qquad \text{Eqn. (7)}$$

where $V_C$, $V_I$, $V_K$, $V_S$ are volume fractions for chlorite (C), illite (I), kaolinite (K) and smectite (S), respectively, in the reservoir rock of a given well depth; $V_C$, $V_I$, $V_K$, $V_S$ are unknown; $CEC_C$, $CEC_I$, $CEC_K$, $CEC_S$ are CEC values for chlorite (C), illite (I), kaolinite (K) and smectite (S), respectively; $CEC_C$, $CEC_I$, $CEC_K$, $CEC_S$ are known from literature and constant for all well depths in the reservoir rock; $CEC_T$ is the apparent CEC value for the mixture of the clay mineral types (total clay) in the reservoir rock of the given well depth; $CEC_T$ is an unknown; and $V_T$ is the total clay volume fraction of the mixture of the clay mineral types in the reservoir rock of the given well depth.

The total clay volume fraction $V_T$ can be related to the volume fractions $V_C$, $V_I$, $V_K$, $V_S$ by:

$$V_T = V_C + V_I + V_K + V_S. \qquad \text{Eqn. (8)}$$

The first computational model of block 109 (e.g., based on one of the mixing laws of eqns. (1) to (8) and the constraints of block 107) can be used to determine multiple apparent CEC profiles for an interval of the well (block 111). The total clay volume fraction ($V_T$) of the mixture of the clay mineral types for the given well depth can be provided as part of block 105 by the machine learning system of block 103 for input to the first computational model of block 109. Each apparent CEC profile of block 111 includes apparent CEC values (e.g., $CEC_T$ values) for a number of well depths (or well locations) within the interval of the well. Because the amounts or concentrations of the predefined set of clay mineral types is unknown, the first computational model will not have a unique solution. In order to address this limitation, the multiple apparent CEC profiles are based on different solutions to the first computational model that assume varying amounts or concentrations of the predefined set of clay mineral types. Specifically, each apparent CEC profile can be based on a solution to the first computational model that assumes particular amounts or concentrations of the predefined set of clay mineral types that is shared over the interval of the well. The particular amounts of concentrations of the predefined set of clay mineral types can be varied over the multiple apparent CEC profiles to account for the unknown amounts or concentrations of the predefined set of clay mineral types.

In block 113, induction log data is obtained for the same well interval. The induction log data can be obtained from downhole logging measurements carried out by an induction tool that is positioned at one or more well locations (or measurement stations) within the well interval. The induction tool can employ several mutually balanced arrays whose signals are recorded separately and combined in software to produce the response desired. Typically, there is one transmitter and five to ten pairs of receivers and bucking coils that are balanced to remove direct coupling. The signals detected by the receivers are combined in a wide variety of ways to produce the responses desired, as for example, deep-reading, high vertical resolution or some combination of both. An example of an induction tool is Schlumberger's Array Induction Imager tool.

In block 115, a second computational model is provided that relates the induction log data at a given well depth to a calculated CEC value. For example, the second computational model can be based on the model and workflow described in U.S. Pat. No. 10,215,876 to Zhang et al., herein incorporated by reference in its entirety. This model uses induction log data at a given well depth along with core sample analysis and formation temperature log data as inputs to determine a calculated CEC value. The second computational model can be used to determine a calculated CEC value for a well depth in the well interval from the induction log data measured at that well depth. This operation can be performed separately for a number of well depths in the well interval such that the second computational model is used to determine calculated CEC values for the number of well depths within the well interval from the induction log data obtained in block 113 (and possibly other data, such as core sample analysis and formation temperature log data). The calculated CEC values for the number of well depths within the well interval can be organized and stored as a calculated CEC profile (block 117).

In block 119, the calculated CEC profile of block 117 can be used as a ground truth, and each one of the multiple apparent CEC profiles of block 111 can be compared, for example, by pattern recognition, to the calculated CEC profile (ground truth) to identify a "matching" apparent CEC profile that belongs to the multiple apparent CEC profiles and most-closely matches or corresponds to the calculated CEC profile. For cases where there is mismatch between the well depths (or well locations) of the multiple apparent CEC profiles and the well depths (or well locations) of the calculated CEC profile, interpolation or approximation methods can be used to determine the multiple apparent CEC profiles and/or the calculated CEC profiles at matching well depths (or matching well locations) suitable for the matching analysis.

In block 121, the "matching" apparent CEC profile identified in block 119 is used to determine amounts or concentrations (preferably as volume fractions) of the predefined set of clay mineral types. These determined amounts or concentrations for the predefined set of clay mineral types can be assigned to (or otherwise associated with) one or more wells depths (or well locations) with the interval of the well or the interval itself. In embodiments, the amounts or concentrations assumed for the predefined set of clay mineral types for the "matching" apparent CEC profile identified in block 119 can represent volume fractions of the predefined set of clay mineral types. In this case, these assumed volume fractions can be selected in block 121 and equated to volume fractions of the predefined set of clay mineral types (e.g., $V_C$, $V_I$, $V_K$, $V_S$) for one or more wells depths (or well locations) with the interval of the well or for the interval itself.

In embodiments, the machine learning system of block 103 can be an ANN or system of ANNs. An ANN is an adaptation of interconnection of brain neurons to a machine for nonlinear mapping of input to output. The ANN architecture, which typically includes input layer, hidden layer, activation function and output layer, controls the workings of the nonlinear mapping of input to output. The nonlinear mapping of the ANN is established by training the ANN. This step is considered an optimization problem with an objective function which is typically defined by a standard least-squares method.

Figure 2:
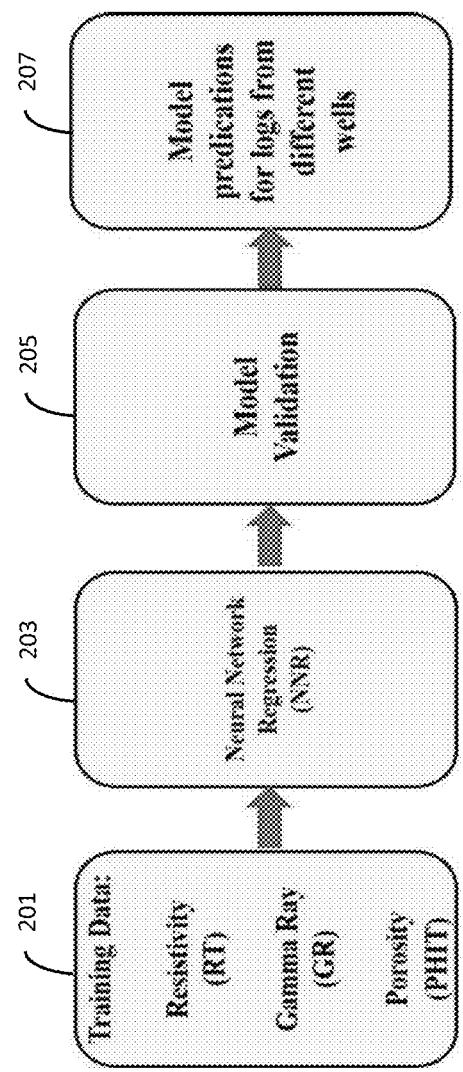
FIG. 2 is a schematic diagram of workflow for training a machine learning system that predicts total clay volume fraction at the given well depth from resistivity log data, formation total porosity log data and gamma ray log data.

In embodiments shown in FIG. 2, the ANN or system of ANNs of the machine learning system of block 103 can be trained using training data (block 201, e.g., resistivity log data, gamma ray log data and formation porosity log data) in combination with neural network regression (block 203) to produce a trained model that predicts (determines and outputs) total clay volume fraction ($V_T$) from well log data (e.g., resistivity log data, gamma ray log data and formation porosity) obtained from different wells. The trained model can be validated (block 205) and then deployed for use (block 207) as described herein.

Figure 3:
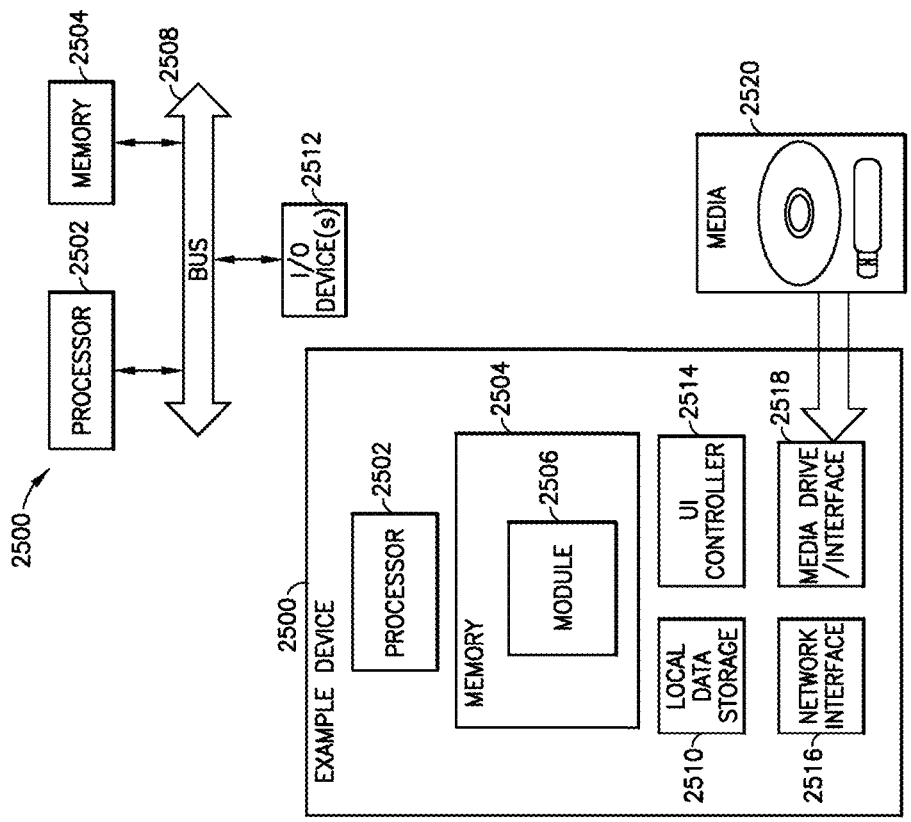
FIG. 3 is a block diagram of a computer processing system, which can be used to embody parts of the methodology and systems as described herein.

FIG. 3 illustrates an example device 2500, with a processor 2502 and memory 2504 that can be configured to implement various embodiments of the methods described herein, including the machine learning system of block 103, the computational models of blocks 109 and 115, storage for the data of blocks 101, 105, 111, 113 and 117, and the operations of blocks 119 and 121 of FIG. 1. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518. Various processes of the present disclosure or parts thereof can be implemented by instructions and/or software programs that are elements of module 2506. Such instructions and/or software programs may reside on removable media 2520 readable by media drive/interface 2518 as is well known in the computing arts.

In one possible embodiment, input/output device(s) 2512 can allow a user (such as a human annotator) to enter commands and information to device 2500 and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes or parts of the method or workflow of the present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

In embodiments, any one or any portion or all of the steps or operations of the method or workflow as described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for characterizing a geological formation comprising:
    a) training at least one artificial neural network (ANN) of a machine learning system using training data collected from well log data of a plurality of other formations, wherein, for each of the plurality of other formations, the training data includes resistivity log data, gamma ray log data, formation porosity log data and volume fractions of total clay;
    b) obtaining well log data of the formation derived from a plurality of different-type logging measurements of the formation, wherein the well log data of the formation comprises resistivity log data of the formation, formation total porosity log data of the formation, and gamma ray log data of the formation, wherein the well log data of the formation comprises a well depth in the formation at which the resistivity log data of the formation, the formation total porosity log data of the formation, and the gamma ray log data of the formation were measured;
    c) providing the well log data of the formation as input to the at least one trained ANN of the machine learning system and determining or estimating a volume fraction of total clay in the formation as output from the at least one trained ANN, wherein the training data includes the resistivity log data measured, utilizing at least one tool, at different well depths of each of the plurality of other formations, the gamma ray log data measured at the different well depths of each of the plurality of other formations, the formation porosity log data measured at the different well depths of each of the plurality of other formations, and the volume fractions of total clay measured at the different well depths of each of the plurality of other formations, wherein the volume fraction of total clay in the formation determined or estimated as the output of the at least one trained ANN of the machine learning system corresponds to the same well depth in the formation, the method further comprising:

repeating the operations of b) and c) for multiple well depths to determine or estimate volume fractions of total clay in the formation at the multiple well depths;

using the volume fractions of total clay in the formation at the multiple well depths to determine amounts or concentrations of a predefined set of clay minerals in the formation, wherein the amounts or concentrations of the predefined set of clay minerals in the formation are determined using first and second computational models, wherein the first computational model relates total clay volume fraction of the formation and amounts or concentrations of the predefined set of clay minerals in the formation to an apparent cation exchange capacity (CEC) value, and wherein the second computational model relates induction log data of the formation to a calculated CEC value;

using the first computational model to generate multiple apparent CEC profiles of the formation from the volume fractions of total clay in the formation at the multiple well depths, wherein the multiple apparent CEC profiles assume varying amounts or concentrations of the predefined set of clay minerals, and wherein each apparent CEC profile includes apparent CEC values for the multiple well depths in the formation:

using the second computational model and induction log data of formation to generate a calculated CEC profile that includes calculated CEC values for the same multiple well depths in the formation;

comparing the multiple apparent CEC profiles to the calculated CEC profile to identify a particular apparent CEC profile of the multiple apparent CEC profiles that best matches the calculated CEC profile; and using the assumed amounts or concentrations of the predefined set of clay minerals for the particular apparent CEC profile to determine the amounts or concentrations of the predefined set of clay minerals in the formation.

2. The method of claim 1, wherein:
the operations of a) and b) and c) are performed by a processor.

3. The method of claim 1, further comprising:
using the volume fraction of total clay in the formation to determine amount or concentration of at least one clay mineral in the formation.

4. The method of claim 3, wherein:
the at least one clay mineral is selected from the group consisting of smectite, chlorite, illite, kaolinite, and combinations thereof.

5. The method of claim 1, further comprising:
using the volume fraction of total clay in the formation to determine amounts or concentrations of the predefined set of clay minerals in the formation.

6. The method of claim 5, wherein:
the predefined set of clay minerals in the formation consists of smectite, chlorite, illite, or kaolinite.

7. The method of claim 4, wherein:
the predefined set of clay minerals in the formation consists of smectite, chlorite, illite, and kaolinite.

8. The method of claim 1, wherein:
the amounts or concentrations of the predefined set of clay minerals represent volume fractions of the predefined set of clay minerals.

9. The method of claim 1, wherein:
the amounts or concentrations of the predefined set of clay minerals represent volume fractions, volume percentages, weight fractions, or weight percentages of the predefined set of clay minerals.

10. The method of claim 1, wherein:
the first computational model is based on a mixing law for the predefined set of clay minerals with known CEC values for the predefined set of clay minerals.

11. The method of claim 10, wherein:
the predefined set of clay minerals in the formation comprises smectite, chlorite, illite, or kaolinite.

12. The method of claim 10, wherein:
the predefined set of clay minerals in the formation consists of smectite, chlorite, illite, and kaolinite.

13. A method for characterizing a geological formation comprising:
a) obtaining induction log data of the formation, the data obtained by positioning an induction tool at one or more locations within a well penetrating the formation;
b) providing a total clay volume fraction and amounts or concentrations of a predefined set of clay minerals in the formation as input to a first computational model and, in response, receiving an apparent cation exchange capacity (CEC) value of the formation as output from the first computational model;
c) providing the induction log data of the formation as input to a second computational model and, in response, receiving a calculated CEC value of the formation as output from the second computational model; and
d) determining amounts or concentrations of a predefined set of clay minerals in the formation based on apparent cation exchange capacity (CEC) value and calculated CEC value of the formation, the method further comprising:
obtaining resistivity log data of the formation, formation total porosity log data of the formation, and gamma ray log data of the formation; and
providing the well log data of the formation as input to at least one trained artificial neural network (ANN) of a machine learning system, wherein the trained ANN is configured to output the total clay volume fraction in the formation in response to receiving, as input, the resistivity log data of the formation, the formation total porosity log data of the formation, and the gamma ray log data of the formation, wherein, before providing the well log data of the formation as input to the at least one trained ANN of the machine learning system, the method comprises:
training at least one ANN of the machine learning system using training data collected from well log data of the plurality of other formations to yield the trained ANN, wherein, for each of the plurality of other formations, the training data includes resistivity log data, gamma ray log data, formation porosity log data, and volume fractions of total clay.

14. The method of claim 13, wherein:
the operations of a), b), c) and d) are performed by a processor.

15. The method of claim 13, further comprising:
using the first computational model to generate multiple apparent CEC profiles of the formation from volume fractions of total clay in the formation at multiple well depths, wherein the multiple apparent CEC profiles assume varying amounts or concentrations of the predefined set of clay minerals, and wherein each apparent CEC profile includes apparent CEC values for the multiple well depths in the formation;
using the second computational model and the induction log data of formation to generate a calculated CEC profile that includes calculated CEC values for the same multiple well depths in the formation;
comparing the multiple apparent CEC profiles to the calculated CEC profile to identify a particular apparent CEC profile of the multiple apparent CEC profiles that best matches the calculated CEC profile; and
using the assumed amounts or concentrations of the predefined set of clay minerals for the particular apparent CEC profile to determine the amounts or concentrations of the predefined set of clay minerals in the formation.

16. The method of claim 14, wherein:
the first computational model is based on a mixing law of the predefined set of clay minerals with known CEC values for the predefined set of clay minerals.

17. The method of claim 13, further comprising:
repeating the operations of a), b), c), and d) for multiple well depths to determine amounts or concentrations of the predefined set of clay minerals at the multiple well depths.

18. The method of claim 13, wherein:
the predefined set of clay minerals in the formation comprises smectite, chlorite, illite, or kaolinite.

19. The method of claim 13, wherein:
the predefined set of clay minerals in the formation consists of smectite, chlorite, illite, and kaolinite.

* * * * *